United States Patent [19]

Barrett, Jr. et al.

[11] 4,454,896
[45] Jun. 19, 1984

[54] AUTOMATIC BATTERY WATER FILLER

[76] Inventors: James H. Barrett, Jr., 5055 Golf Creek Rd., Sylvania, Ohio 43560; Carl Schultz, 7117 N. County Rd. 33, Tiffin, Ohio 44883

[21] Appl. No.: 418,082

[22] Filed: Sep. 14, 1982

[51] Int. Cl.³ .............................................. B67D 5/00
[52] U.S. Cl. .................................... 141/209; 251/280
[58] Field of Search ............... 137/390; 141/1, 40, 141/42, 43, 95, 96, 153, 198, 200, 206, 207, 208, 209, 219, 225, 392; 251/280

[56] References Cited

U.S. PATENT DOCUMENTS

| | | | |
|---|---|---|---|
| 1,725,826 | 8/1929 | Payne | 141/209 |
| 2,309,503 | 1/1943 | Frank | 141/209 |
| 2,354,209 | 7/1944 | Hammand | 141/209 |
| 2,402,036 | 6/1946 | Giger | 141/225 |
| 2,595,166 | 4/1952 | Rhodes | 141/209 |
| 2,822,831 | 2/1958 | Williams | 141/209 |
| 3,095,901 | 7/1963 | Larson et al. | 251/280 X |
| 3,134,408 | 5/1964 | Marden et al. | 141/209 |
| 3,208,486 | 9/1965 | Fromm | 141/208 |
| 3,380,491 | 4/1968 | Rosell et al. | 141/209 |
| 3,881,528 | 5/1975 | Mackenzie | 141/207 X |
| 3,957,093 | 5/1976 | Stoner | 141/209 |
| 4,027,708 | 6/1977 | Hansel | 141/209 |

FOREIGN PATENT DOCUMENTS 629562 9/1977 U.S.S.R. ................................ 141/95

Primary Examiner—Stephen Marcus
Assistant Examiner—Mark Thronson
Attorney, Agent, or Firm—Hugh Adam Kirk

[57] ABSTRACT

A lightweight acid-resistant plastic dispenser having a handle housing enclosing a valve and valve-operating mechanism and remote therefrom on a rigid tubular extension a plastic water nozzle and a flexible hose connected to a water source.

The nozzle of the dispenser has two ducts, one for water and the other for aspirated air to produce a suction when the level of the liquid in the battery cell being filled reaches the lower end of the nozzle. The aspirated or suction air operates a diaphragm to break a toggle in the valve-operating mechanism, automatically shutting the water valve in the handle housing.

The valve control mechanism in the handle comprises a double toggle composed of three alignable links which when aligned operate against the normally spring-pressed water valve to hold it open. The alignment of the links is performed by a manual plunger operated by the operator's thumb and comprises two longitudinally relatively movable parts, one pivoted to one of the intermediate links and is lockable in operating position, and the other abuts the central link and is free to move longitudinally. An adjustable lever connected to one end of the diaphragm in the housing and abuttable at the other end with the other intermediate pivot of the links, breaks the toggle when the suction occurs at the nozzle.

17 Claims, 8 Drawing Figures

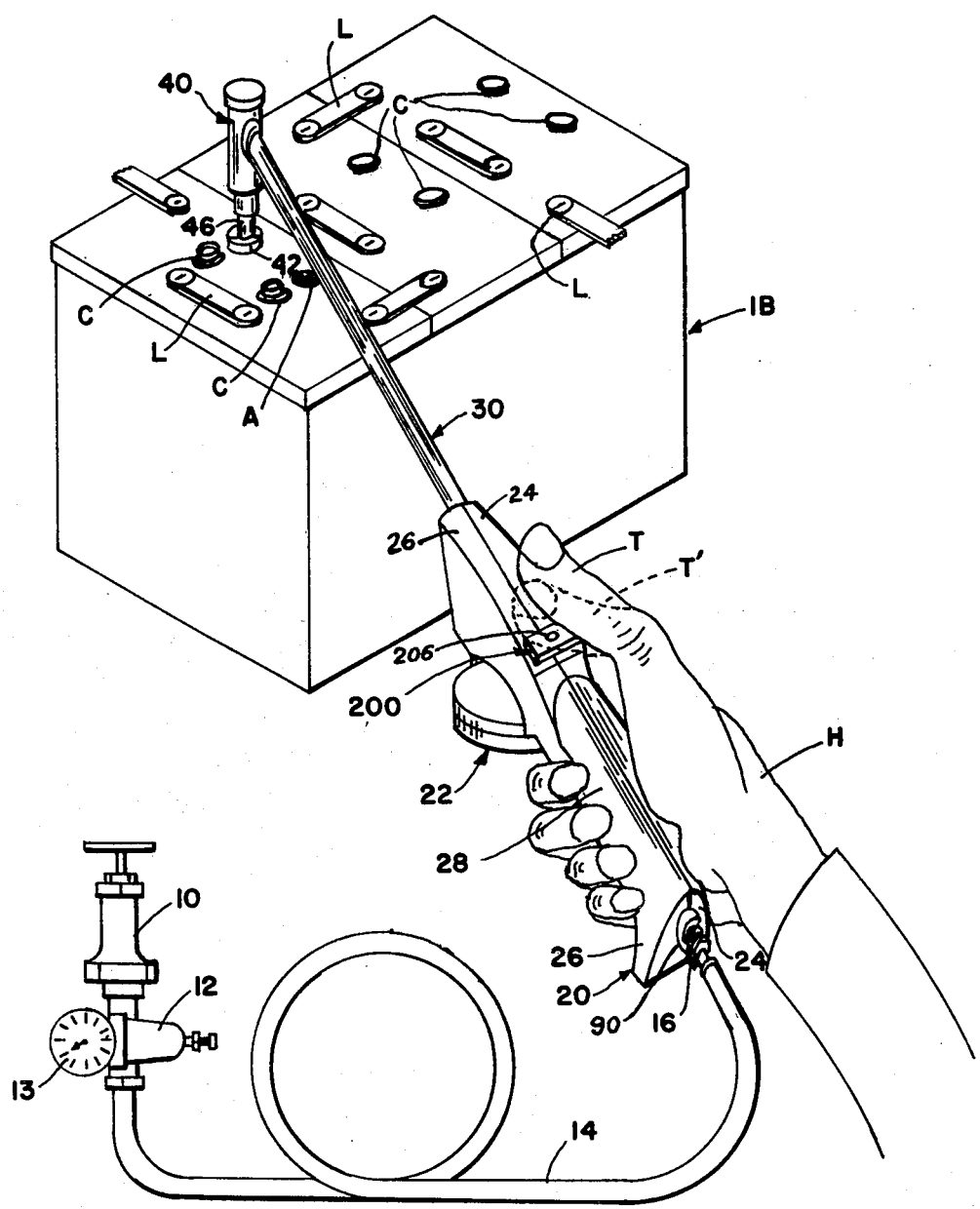
FIG. I

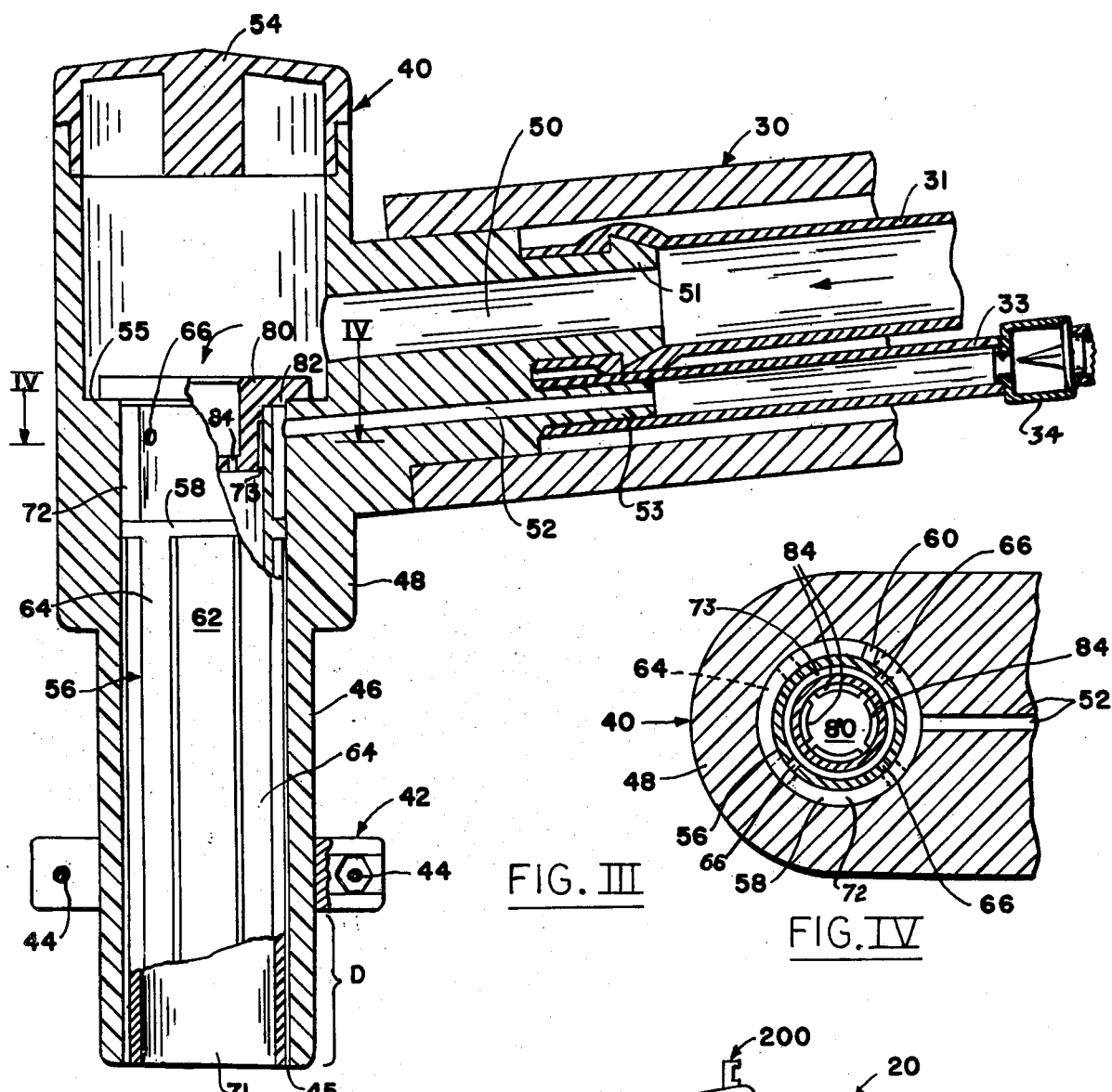
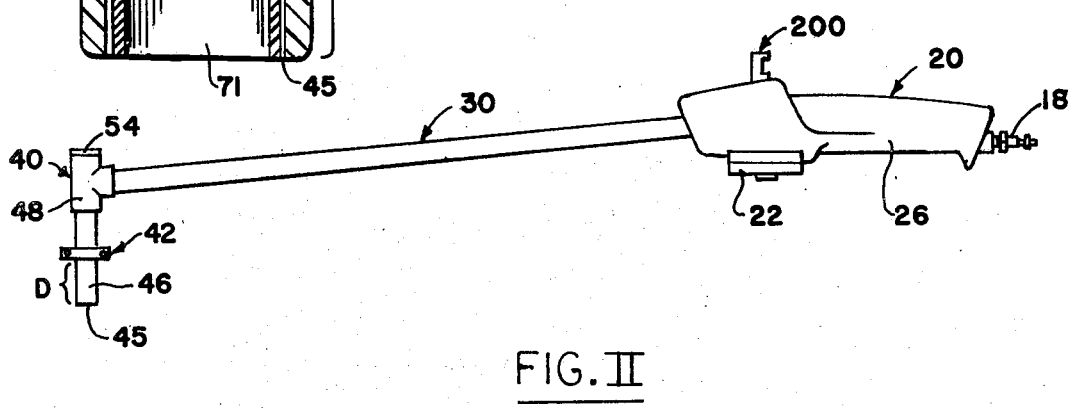
FIG. III
FIG. IV
FIG. II

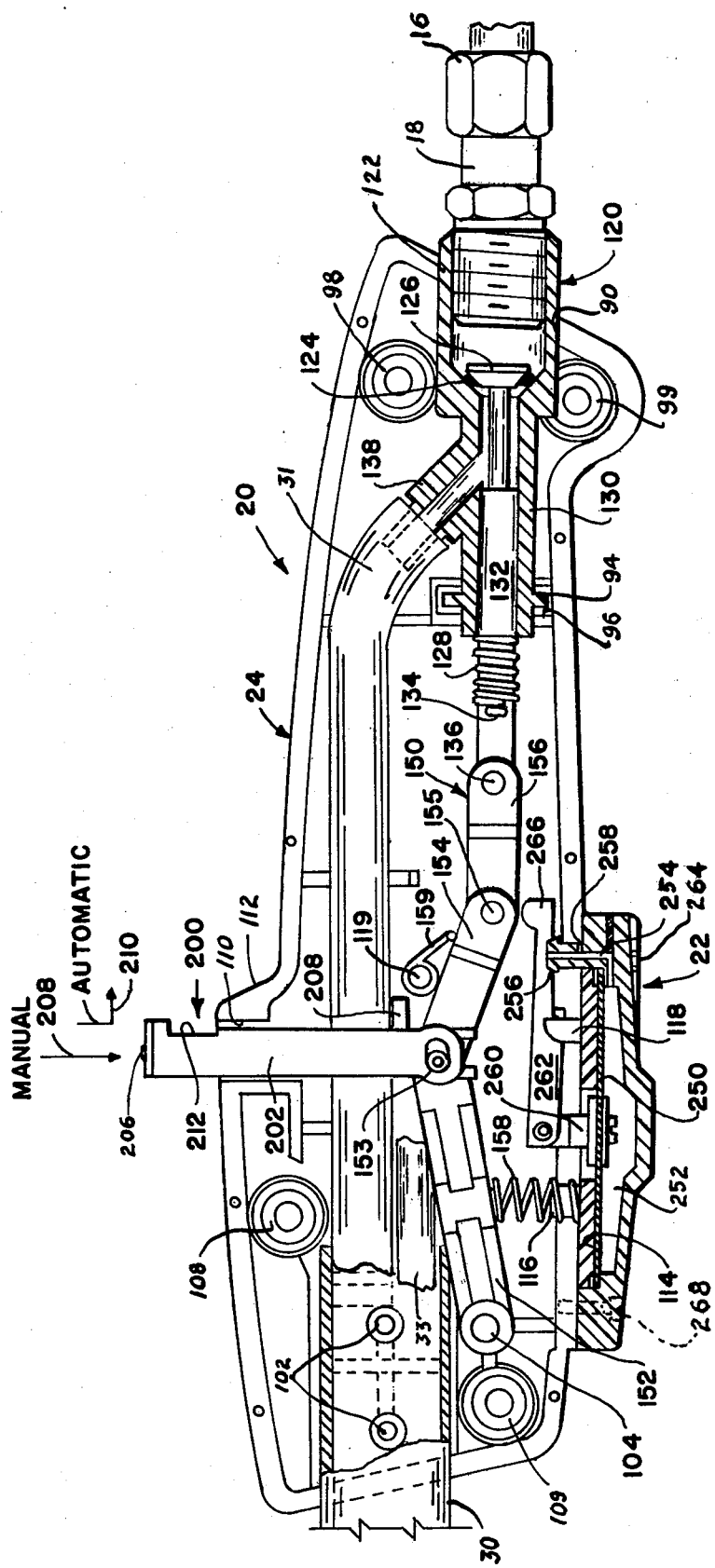
FIG. V

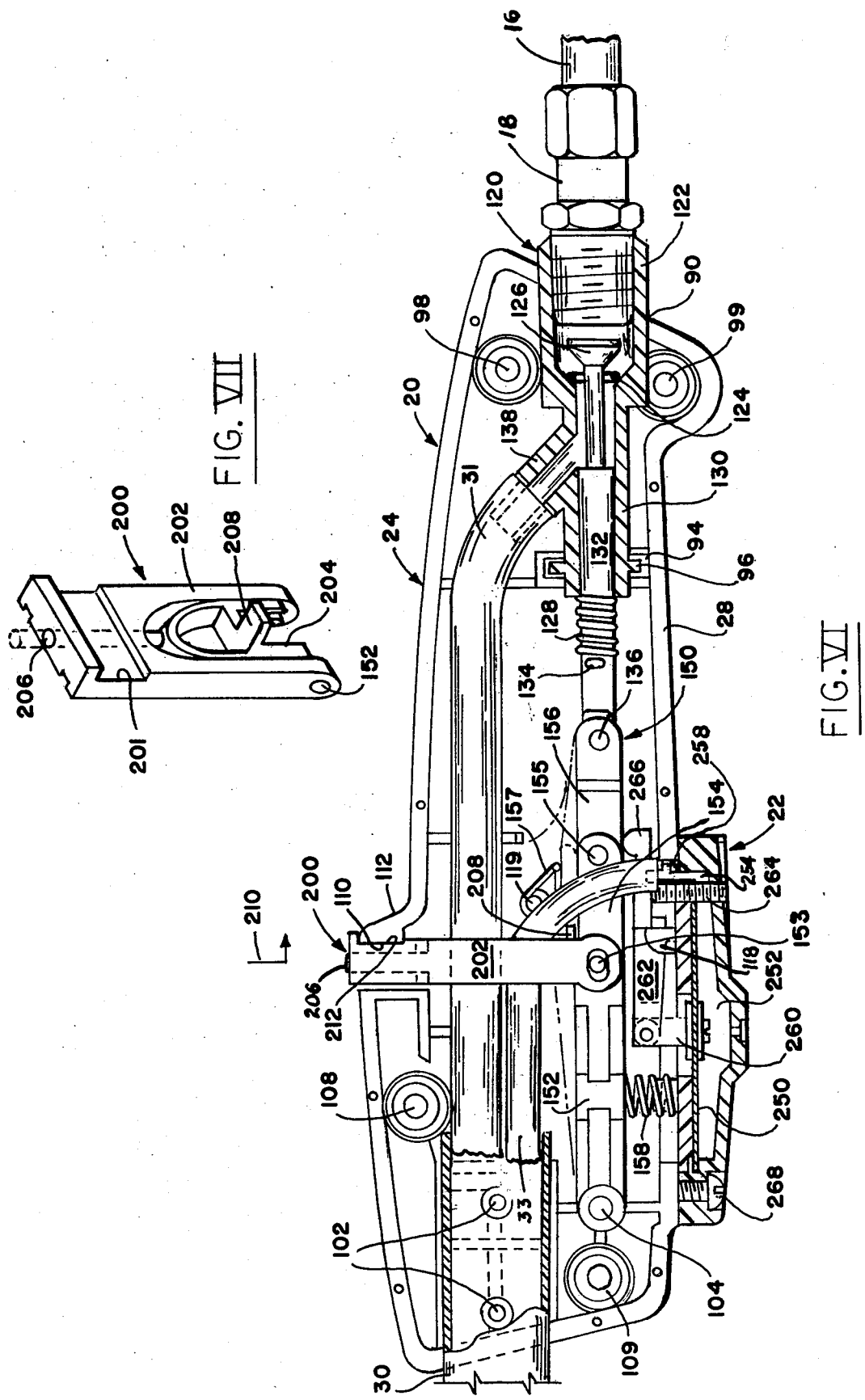

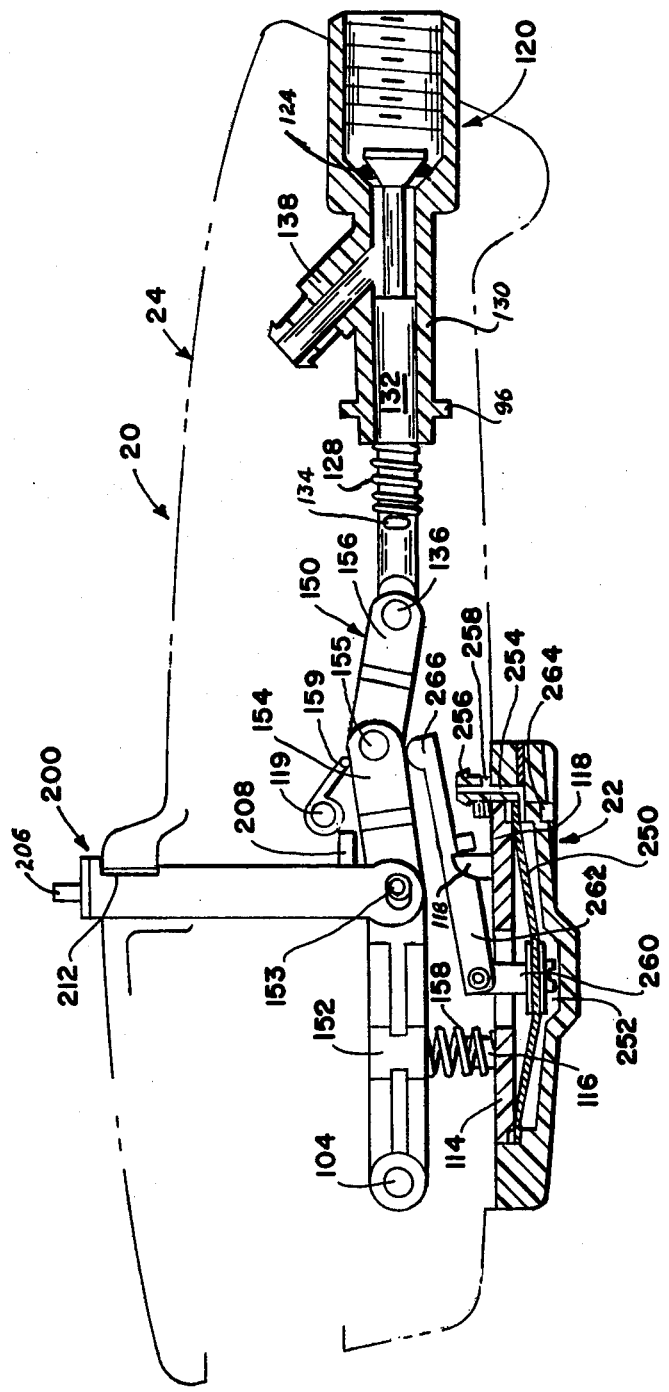

AUTOMATIC BATTERY WATER FILLER

BACKGROUND OF THE INVENTION

Although automatic shut-off liquid dispensing valves and devices are known, both in the art of gasoline tank filling nozzles which are very rugged and relatively insensitive and heavy as shown by Payne U.S. Pat. No. 1,725,826 issued Aug. 27, 1929; Frank U.S. Pat. No. 2,309,503 issued Jan. 26, 1943; Rhodes U.S. Pat. No. 2,595,166 issued Apr. 29, 1952; Fromm U.S. Pat. No. 3,208,486 issued Sept. 28, 1965; and Giger U.S. Pat. No. 2,402,036 issued June 11, 1946, and in the art of battery-filling devices as disclosed in Williams U.S. Pat. No. 2,822,831 issued Feb. 11, 1958 and Stoner U.S. Pat. No. 3,957,093 issued May 18, 1976. Also several of these patents disclose mechanisms including toggles which are employed for controlling their valves for dispensing liquid. However, no one or combination of these references discloses applicants' specific combination of features, or applicants' two-part manual plunger means and its dual functions of automatic control and overriding ability. Furthermore, applicants' dispenser is made of rigid lightweight acid-resistant materials which add to its sensitivity of operation and durability for use with acid and electrical equipment without hazard or deterioration.

SUMMARY OF THE INVENTION

Generally speaking, the battery water dispenser of this invention comprises connected together in succession: a source of water, means for insuring that the pressure of the source is within a predetermined range, which herein is between about 30 and 50 psi, a flexible hose, a lightweight handle housing for a valve and its control mechanism, a rigid extension, and a remote nozzle which senses the liquid level, such as in a secondary battery cell. The majority of these parts are made of non-corrodible non-electrical conductive reinforced and durable plastic so the apparatus is of relatively light weight, easily manipulable, and safe from any electrical shorting.

The nozzle comprises two concentric normally axially vertical tubular ducts, one of which is for the water and the other, usually the annular duct, is for air aspirated therefrom by the flow of water through the central duct past at least one aperture at its upper end into the annular or air duct. Both ducts have their lower ends in the same horizontal plane so that when this plane end of the nozzle is contacted by the liquid level in the cell, the annular air duct is blocked and a suction is communicated back to the valve-operating mechanism in the handle housing which automatically shuts off the water if not manually overridden. Around the outside of the outer tubular member of the housing there is provided an adjustable ring which acts as a stop for limiting the distance to which the nozzle may be inserted into the aperture of a battery cell and thus, when permitted, automatically gauges the liquid level therein.

The valve control mechanism inside the plastic handle housing of the battery water filler or water dispenser device of this invention comprises a double toggle of three alignable links which when and while aligned operates against a spring to open and keep open the valve that allows water to flow from the source through the hose and dispenser valve and extension to the nozzle. A two-part plunger means has one of its parts pivotally connected to one of the two intermediate pivots of the three links of the double toggle, which plunger parts are extendible out of the housing and are pressed into the housing by an operator's thumb to align the toggles and open the valve. The other plunger part which is moved coaxially with the first plunger part abuts with the central link of the toggle to insure the alignment of the links. As long as both plunger parts are held in by the operator, the valve is manually controlled and will be maintained open permitting flow of water from the nozzle. For automatic operation, however, there is provided a locking notch in said one plunger part to hold it into its housing inward position so that the thumb can be released freeing the other plunger part to be projected from the housing when the automatic shut-off operates. This automatic shut-off mechanism comprises a diaphragm mounted in the housing, one closed chamber side of which diaphragm is directly connected with the suction-producing duct in the nozzle so that as soon as the liquid level touches the lower end of the nozzle to close the annular air duct, the aspirator effect of the water flowing through the central nozzle duct immediately operates or moves the diaphragm to the center of which diaphragm is pivotally connected one end of a lever, the other end of which lever engages the toggle link near the other intermediate pivot to break the toggle alignment so that the spring on the valve will close the valve and simultaneously project the second separately movable plunger part out of the housing. Separate spring means are provided to urge the link pivoted to the first plunger part out of alignment so that the plunger acts against its operation, and to hold the central link in alignment once the thumb is released from the plunger parts. Thus this second spring is of weaker nature than the former spring, and is easily overcome by the lever operated by the diaphragm. Because of the high sensitivity of this lever, there is provided a set screw for varying the fulcrum thereof to insure the exact alignment of the central and valve connected links, and the easy breaking of the toggle by the action of the diaphragm.

OBJECTS AND ADVANTAGES

Accordingly, it is an object of this invention to produce a combination automatic and manually-operated water dispensing device, such as for filling secondary storage batteries, which is simple, efficient, effective, lightweight, adjustable, sensitive, economic, non-corrosive, acid-resistant, and easily manipulable.

Another object is to produce such a water-dispensing device for secondary batteries which has a nozzle that aerates the liquid in the battery cells to release hydrogen and thereby reduce explosion hazards.

Another object is to produce such a device which will reach into narrow horizontal spaces and may be pre-adjusted to insure an equal liquid level in a plurality of battery cells.

Still another object is to produce such a device which is electrically non-conductive and avoids shorting or electric shock, even if it is dropped across the terminals of the batteries.

BRIEF DESCRIPTION OF THE VIEWS

The above mentioned and other features, objects and advnatages, and a manner of attaining them are described more specifically below by reference to an embodiment of this invention shown in the accompanying drawings, wherein:

FIG. I is a perspective view of a dispenser according to a preferred embodiment of this invention in a position for filling water into the cells of a secondary industrial battery pack from a pressure-regulated source through a flexible duct or hose and a manual and automatic valve handle housing held by an operator's hand with his thumb released from the operating plunger means for automatic operation of the device;

FIG. II is a reduced side elevation of the handle, nozzle and their rigid connecting tube of the dispenser shown in FIG. I with the thumb-operated plunger means extended indicating the valve in its handle closed position;

FIG. III is an enlarged vertical sectional view through the nozzle shown at the left in FIG. II, and showing the two concentric tubes therein and their connecting ducts;

FIG. IV is a section taken along lines IV—IV of FIG. III showing the apertures in and through the concentric tubes in the nozzle;

FIG. V is an enlarged vertical sectional view of the handle part of the dispenser shown in FIGS. I and II showing the valve control portion of the device showing the valve closed and the toggle links, diaphragm lever and manual plunger means for controlling the valve in their normal inoperative positions;

FIG. VI is a vertical sectional view similar to that of FIG. V, but with the valve open and its control mechanisms in their automatic operable positions;

FIG. VII is a perspective view of the two-part manually operated plunger means shown in FIGS. V and VI; and FIG. VIII is a view similar to FIGS. V and VI but showing the valve in its closed position closed by the operation of the diaphragm and lever automatic operating mechanism.

DETAILED DESCRIPTION OF A PREFERRED EMBODIMENT

A. The Combination

Referring to FIG. I there is shown the complete apparatus combination for the optimum operation of the dispensing device according to this invention for use in filling the cells of a multi-cell industrial battery arrangement IB. This apparatus comprises a source of a water supply such as a spigot 10 preferably to which is connected an adjustable pressure regulator 12 with a gauge 13 to maintain a water pressure of between about 30 and 35 psi to insure the proper and sensitive operation of the dispensing apparatus and device of this invention. From the pressure regulator 12 there is provided a length of flexible hosing 14, such as of 25 or 50 feet in length, having at its outer free end a quick connect and disconnect female coupling 16 for connection with a male quick connect and disconnect coupling 18 mounted at the end of the handle housing 20 shown in more detail in FIG. VI. This handle housing is to be held by the hand H of the operator of the device, with his thumb T shown in full lines in position for automatically filling the cells of the battery IB, but in dotted lines T' in the position for starting or maintaining the operation of the mechanism to open the valve 120 inside the handle housing 20. Connected rigidly to and remote from the handle housing 20 via a plastic tube 30 is a nozzle 40 extending at right angles to the outer end of the tubular extension 30 and having surrounding its lower nozzle end a vertically adjustable stop ring 42. This ring 42 may comprise two semicircular sections held together by means of screws 44 tangentially thereof (see FIG. III) for frictionally gripping the outer cylindrical surface 46 of the nozzle 40. Thus by adjusting the ring 42 vertically along the cylindrical nozzle surface 46, a position is selected which can insure the same level of liquid in each of the battery cells IB determined by the distance D (see FIGS. II and III) between the lower surface of the ring 42 and the lower end 45 of the nozzle 46. This ring 42 acts as a stop when abutting the top of the apertures A of each cell to be filled with liquid.

The housing 20 is shown to have a disc-shaped portion 22 on its bottom in which is mounted a diaphragm for operating the automatic shut-off part of the valve control mechanism inside the housing 20. The only movable part of the handle mechanism shown in FIGS. I and II is the two-part plunger means 200 shown fully extended in valve closed position in FIG. II, and fully inside the housing 20 shown in full lines in FIGS. I and VI, having been pressed in and locked in said position by operation of the thumb T to T' of the operator's hand H by the movement shown in accordance with the arrow 210 in FIG. V, to put the plunger means 200 in the position shown in FIGS. I and VI.

The pressure regulator 12 may be of metal, preferably brass, and the valve piston 132 inside the valve 120 inside the handle portion 20 may be of metal or brass, as also may be the quick disconnect fittings 16 and 18 that extend from the rear portion of the handle member 20. However, all the rest of the apparatus is made of a lightweight rigid plastic, except for the screws that hold it together which are made preferably of brass or stainless steel. The hose 14 may be made of a flexible plastic or rubber with sufficient strength to hold the pressure of say 60 psi for safety measures. The handle mechanism 20 comprises two substantially equal halves split vertically and longitudinally and each are made of reinforced durable plastic, such as glass fiber reinforced polypropylene. Similarly the nozzle 40 is made of the same material while the extension tube 30 may be made of extruded rigid polyvinyl chloride plastic. In any event, all of the parts of the mechanism 20, 30 and 40 are non-electrically conducting so that if they ever contacted any of the terminals L of the battery IB, no shorting will occur. Two of the caps C of these battery cells have been removed from two adjacent cells as shown in FIG. I to expose the water inlet aperture A, while the caps C of the remaining cells are covering their apertures A.

B. The Nozzle

Referring now more specifically to FIGS. III and IV, the nozzle 40 at the outer end of the tubular extension 30 has an integral T-shaped upper portion 48, which may be at a slight angle from 90° with the tube 30. The portion of the T-part 48 aligned with the tube 30 contains a pair of parallel apertures: 50 for water or liquid, and 52 for air or vacuum. These separate apertures are provided with nipple ends 51 and 53, respectively, over which may be connected plastic tubes or hoses 31 and 33. These tubes 31 and 33 extend inside the tubular extension 30 to the handle housing 20 and the tube 33 preferably has a check valve 34 to prevent water from being sucked into the chamber 252 in the handle portion 20. The upper end of the T-section 48 is capped with a cap member 54 which may be heat or adhesive sealed thereto.

Inside the outer lower tubular portion 46 of the nozzle 40 there is an inner tubular section 56 which has an outwardly extending flange 58 near or at its upper end, which flange has at least one radial gap or slit 60 which connects with one or more of the longitudinal grooves 62 between the intermediate longitudinal rib sections 64, which ribs extend down from the flange to the end 45 of the nozzle and contact the inside of the outer tubular member 46. Around and near the top of the tubular section 56 which may extend above the flange 58 there are provided one or more radial apertures 66 for communication between the annular outer tube channel 72 and the grooves 62 and the inner water conducting channel or duct 71. In the upper end of the ducts 71 and 72 there is provided a cup-shaped member 80 having stepped outwardly extending flange 82 for seating against the shoulder at 55 in the T-section 48, and also, if extended, the upper end of the inner tube 56. The plastic cup 80 is either heat sealed or adhered to the shoulder 55 and, if extended, the upper end of the tube 56 to seal and locate them in position before the cap 54 is sealed onto the T-member 48. This cup 80 directs the water through quadrant arcuate slots 84 (see FIG. IV) along the inside surface of the inner tube 56 of duct 71 and to provide an aspirator-type suction in the annular gap portions 72 and 73 between the outside of the cup 80 and the inside of the upper end of the tubular portion 46. Since the holes 60 and 66 are in communication through the grooves 62 to the openings at the bottom end 45 of the nozzle 40, no reduced pressure or vacuum is transmitted through the ducts 52 and 33 back to the handle portion 20 or its diaphragm 250 in the housing 22. However, continued flow of the water through the ducts 31, 51 and 71 sucks air from the annular space 72 and grooves 62, and once the ends of the grooves 62 are blocked by the liquid level touching the bottom 45 of the nozzle, the aspirator suction is immediately transmitted through the tubes 52 and 33 and check valve 34 back to the handle portion 20 to flex the diaphragm 250 in the portion 22 and automatically shut off the valve 120 by operating the toggle control mechanism in the handle described later in Section G.

C. The Handle Portion

Referring now specifically to FIGS. V, VI, and VIII, there is shown one of the two substantially identical and complementary molded plastic handle sections 24 with complementary section 26 shown in FIGS. I and II, having a hand grip section 28 adjacent the rear of the housing portion 20 and having a semicircular rear aperture 90 in each section 24 and 26 for the valve intake 122. These sections 24 and 26 are provided with seats 94 for the flange 96 on the valve assembly 120 to prevent it from being pulled from the handle section. On each side of the valve 120 are provided centrally apertured bosses 98 and 99 in each section 24 and 26 through which stainless steel screws or bolts may be employed for assembly of the two sections. Similarly, near the other or forward end of the housing are an additional pair of apertured bosses 108 and 109 for the same purpose. Also at the forward end of each housing section 24 and 26 there are provided a pair of bosses 102 which engage corresponding apertures in the diametrically opposite sides of the rigid extension tube 30 for anchoring it in position in the front end of the handle portion 20. Still further there is provided a fixed pivot boss 104 adjacent the boss 109 and below the tube 30 for fixedly anchoring the pivot at one end of the double toggle link mechanism 150.

Thus there are two semicircular apertures at opposite ends of each of the housing sections 24 and 26 to provide entrance for the valve intake 122 and the rigid extension tube 30. The only other aperture 110 in this housing 20 is formed by two notches in the top stepped section 112 for extension of the two-part plunger mechanism 200. The stepped section also is formed to lock with a notch 212 in one of the plunger parts when in its inward position as shown specifically in FIGS. VI and VIII.

D. The Valve

Still referring to FIGS. V, VI and VIII, there is shown in section the valve 120 mounted in the rear handle or grip portion 28 of the handle housing 20, the intake 122 of which valve 120 projects slightly outside of the handle housing and is internally threaded for receiving the male portion of the quick disconnect member 18 for the hose 14. At the inner shoulder of the intake 122 there is provided a valve seat with a gasket or O-ring 124 against which the valve head 126 is normally urged into sealing engagement to close the valve 120 as shown in FIGS. V and VIII. This urging is by means of helical compression spring 128 compressed between the outer end of the cylindrical valve housing 130 for guiding the valve rod or piston 132, and a transverse pin 134 on said rod 132. The outer end 136 of this valve rod 132 is pivoted to the other end of the double toggle or three-link control mechanism 150. The branch outlet 138 of the valve 120 is connected to the other end of the flexible plastic tube 31 extending to the T-section 48 of the nozzle 40 through the rigid tubular extension 30. Thus when the valve 120 is open by positioning the valve head 126 in the position shown in FIG. VI, water flows through the hose 14, valve 120, tube 31 and out through the central portion 71 of the nozzle 40. This flow will continue until the valve head 26 closes the valve 120, which can be accomplished, either manually or automatically as will be described below in Sections F and G, respectively.

E. Double Toggle

Still referring to FIGS. V, VI and VIII, the double toggle control mechanism for the valve 120 comprises three links 152, 154 and 156 pivoted at their ends and connected for alignment as shown in FIG. VI to compress the spring 128 and open the valve 120. However, when either adjacent pair of these links 152, 154 and 156 are not in alignment as shown in either FIG. V or VIII, the spring 128 automatically closes the valve 120. The longer link 152 is pivoted to the fixed boss 104 and the two shorter links 154 and 156 are pivotally connected successively to the free end of link 152 and then to each other; the shorter link 156 being pivotally connected at 136 to the end of the valve piston 132 that operates the valve 126. Thus there is provided two intermediate pivots 153 and 155, either or both of which if pushed out of alignment with the end pivots 104 and 136 would permit the spring 128 to close the valve 120.

Below the link 152 is mounted a central apertured disc 114 which mounts a boss 116 that locates a compression spring 158 which normally urges the link 152 out of its alignment position, namely that shown in FIG. V. Also mounted on this disc 114 diametrically opposite the boss 116 are a pair of spaced guide projections 118 for the lever 262 of the automatic shut-off mechanism described in Section G below.

On the inside of the housing section 24 just above the central link 154 there is a boss 119 for mounting a helical torsion spring 159 which maintains the central link 154 in alignment when no positive pressure is applied thereto by the plunger mechanism 200 described next below.

F. Two-Part Plunger

Referring now to FIGS. V, VI, VII and VIII, the two-part plunger shown most clearly in FIG. VII comprises an outer first part 202, and movable relatively and axially thereto an inner stirrup part 204 which has a rod extension 206 extending coaxially and upwardly through a hole in the upper end of the inverted U-shaped first part plunger 202. The lower ends of the first and outer plunger part 202 are pivoted to the pivot 153 between the links 152 and 154. This pivotal connection at 153 permits the two-part plunger to rock back-and-forth in its slot 110 so that they can be pushed manually down and back by the thumb T and T' in the direction of the arrow 210 and the plunger part 202 held or locked in its inward position maintaining the link 152 in alignment. This locking does not affect the operation of the inner plunger part 204 which has an outwardly extending abutment portion 208 which engages the upper side of the link 154, and which part 204 is free to move upwardly into the position shown in FIG. VIII when the toggle 154 is moved out of alignment by the operation of the automatic shut-off mechanism pushing against the pivot 155 as shown in FIG. VIII. The notch in the abutment 208 in the part 204 is to provide a space for the spring 159.

Thus, when the operator's thumb T and T' pushes the plunger mechanism 200 inwardly including both parts 202 and 204, the operator has complete manual control over the valve 120, and as long as he holds his thumb T' on the plungers and keeps them in their inward position as shown in FIGS. I and VI, the valve 120 will remain open and water will flow out the nozzle, regardless of what level the liquid is in the battery cell, or if the level has contacted the end 45 of the nozzle 40 or not. However, if the thumb T is removed from the plungers 200 and the plunger part 202 is not locked in position as shown in FIG. VI, of course the toggle will be broken in view of the action of the spring 158 and the water will be shut off. On the other hand, if the outer plunger part 202 is locked in position as shown in FIGS. VI and VIII, and the thumb T is still removed, so that its notch 212 engages the edge 110 of the shoulder 112, then the automatic shut-off mechanism controls the operation of the dispensing device, and when shut-off occurs, the inner plunger part 204 is free to move upwardly into the position shown in FIG. VIII, and the toggle 150 is broken and the valve 120 again is automatically closed.

G. Automatic Cut-Off By Diaphragm and Lever

Referring again to FIGS. V, VI and VIII, and particularly FIG. VIII, below the disc 114 there is mounted a flexible diaphragm 250, the periphery of which is sealed into the circular disc-shaped chamber 252 of projection 22 on the handle portion housing 20. Although the section 22 of the handle 20 is separable, it is attached thereto by means of a plurality of circumferentially spaced screws 268 which also seal the periphery of the diaphragm 250 forming one side of the chamber 252. This chamber 252 is connected via the duct 254 to a nipple 256 to which is connected one end of the suction hose 33 that extends to the annular aspirator suction duct in the nozzle 40, to apply any quick reduction in air pressure to the chamber 252 to move the diaphragm from the position shown in FIGS. V and VI to that shown in FIG. VIII. There is provided a very small bleeder hole 258 in the side of the lower end or base of the nipple 256 which relieves the suction in the duct of the hose 33 and prevents water from backing up into this hose and filling the chamber 252. This hole 258 is sufficiently small so that the quick application of the suction which occurs in the line 33 when the level reaches the bottom 45 of the nozzle 40 will cause the diaphragm to move and thus operate the automatic shut-off mechanism.

Attached to the center of this diaphragm 250 is a pivot support 260 which is connected to one end of a lever 262 guided between the parallel fingers 118 on the disc 114. The intermediate fulcrum of this lever 262 is the end of an adjustable set screw 264 so that when the diaphragm 250 and lever 262 are in the positions shown in FIGS. V and VI, the opposite end 266 of the lever 262 will just contact the lower surfaces of the links 154 and 156 adjacent the pivot at 155 when these links are in alignment as shown in FIG. VI. Thus, the slightest motion of the diaphragm 250 to operate or tilt the lever 262 will break the toggle at the pivot 155 and the spring 128 on the piston 132 of the valve 120 will immediately cause the valve 120 to close as shown in FIG. VIII. Although the lever 262 must operate against the torsion action of the spring 159, this action of the spring 159 is not very strong, but just sufficient to prevent any jarring of the handle housing 20 from closing the valve 128 by breaking the toggle at pivot 155 when the thumb T is not pushing on the pin 206 of the inner or second part of the plunger mechanism 200.

It is to be understood that the structure of the parts may be changed without departing from the scope of this invention. However, the lighter and the stronger the material that is employed, the easier the mechanism will be to operate.

While there is described above the principles of the invention in connection with specific apparatus, it is to be clearly understood that this description is made only by way of example and not as a limitation to the scope of this invention.

We claim:

1. In an automatic liquid shut-off dispensing device having a handle housing containing a normally closed valve and an operating mechanism for opening said valve, a liquid supply having a given pressure range connected by a flexible duct to said valve, and a suction-creating nozzle rigidly connected to said handle housing, the improvements in said operating mechanism comprising:

(1) a double toggle means composed of three alignable pivotally connected links, one end of said toggle means being pivoted to a stationary pivot in said housing, and the other end of said toggle means being pivotally connected to said valve for opening said valve when said toggle links are aligned, (2) a manual plunger means projectable from said housing, said plunger means operable for aligning said links to open said valve and having two relatively movable parts, one lockable in aligning position and pivotally connected to one of the pivots interconnecting said pivotally connected links, and the other part for aligning the middle one of said links, and (3) a suction-operated lever means movable against the other of the pivots interconnecting said pivotally connected links for breaking the alignment of said links to permit closing of said valve and moving said other plunger part.

2. A dispensing device according to claim 1 including an adjustable ring means around said nozzle for limiting the extension of said nozzle into an opening.

3. A dispensing device according to claim 1 wherein said liquid supply includes a pressure regulator means.

4. A liquid dispensing device according to claim 1 wherein said liquid supply includes a quick-disconnect fitting with said handle housing.

5. A dispensing device according to claim 1 wherein said other plunger means part comprises a pin projectable from said housing through said one plunger means part and includes an abutment for engaging said middle one of said three links.

6. A dispensing device according to claim 1 including a plurality of separate spring means for normally closing said valve, for urging one of said three links of said double toggle means out of alignment, and for urging said middle one of said three links into alignment.

7. A dispenser according to claim 1 wherein said housing and nozzle are composed of a relatively lightweight and rigid reinforced plastic material.

8. A dispenser according to claim 7 wherein said plastic material comprises glass fiber reinforced polypropylene and wherein said device includes an extension tube which comprises polyvinyl chloride.

9. A dispenser according to claim 1 wherein said dispensed liquid is water.

10. A dispenser according to claim 1 wherein the liquid pressure range is between about 30 and 35 psi in said duct to said valve.

11. A dispenser according to claim 1 wherein said housing and nozzle are made of an acid-resistant material.

12. A liquid supply nozzle assembly with a liquid level sensing automatic shut-off mechanism comprising:
(A) a liquid supply duct,
(B) a handle housing connected to said duct and having a nozzle extension,
(C) a normally spring-urged shut-off valve for said duct in said housing,
(D) three successive alignable toggle links in said housing with two joints connecting said links, one end of said links being connected to said valve and the other end being connected to a fixed pivot in said housing, said links being normally spring-urged to maintain said valve shut off,
(E) a normally operated plunger orthogonally extending and pivoted to one of the two said joints between said links, said plunger extending out of said housing to be manually pressed to align said toggle links to open said valve against said urging springs, said plunger being lockable in valve open position,
(F) a negative air pressure operated diaphragm in a chamber in said housing connected by an air duct through said nozzle extension,
(G) a lever in said housing operated by said diaphragm to break the alignment of said toggle links at the other joint between said links to cause said urging spring to close said valve, and
(H) a nozzle connected to the outer end of said nozzle extension and having concentric tubular ducts flush with the open end of said nozzle, the inner concentric tubular duct being connected to the liquid from said valve through said nozzle extension and the outer concentric tubular duct being connected to the air in said chamber through said nozzle extension, said nozzle having an aperture spaced from said open end of said nozzle between said concentric ducts, whereby cutting off the air in said outer duct by contact of the open end of said nozzle with a liquid level causes a negative pressure to be immediately produced in said chamber to move said diaphragm to operate said lever to break the toggle to cause said urging spring to shut off said valve.

13. A nozzle according to claim 12 wherein said air chamber has a bleeding hole to prevent said liquid from being sucked into said air duct toward said chamber after said valve has been shut off.

14. A nozzle according to claim 12 wherein said air duct contains a check valve.

15. A nozzle according to claim 12 wherein said plunger has a separate pusher member manually operable with said plunger for preventing the breaking of said toggle links until said diaphragm operates said lever.

16. A nozzle according to claim 15 wherein a spring means aids the operation of said pusher member.

17. A non-corrodible automatic shut-off water dispenser for filling secondary batteries comprising:
(A) a water supply source including a pressure regulator, a flexible duct, and a quick-disconnect fitting between said flexible duct and the following part of said dispenser,
(B) a plastic handle housing containing:
(1) a normally spring-urged closed valve connected to said fitting of said duct,
(2) a double toggle of three pivotally connected alignable links, one end of said toggle being connected to a fixed pivot in said housing and the other end of said toggle being connected to said valve for opening said valve when all three of said toggle links are aligned,
(3) separate spring means engaging two of said links, one for urging one link out of alignment with the other two links, and the other for urging the other of said two links toward alignment,
(4) two coaxially relatively movable plunger means, one end of each of which is projectable out of said housing and the other end of one of which is pivoted to one of two intermediate pivots of said toggle means, and the other end of the other one of which abuts the central link of said three toggle links, whereby said plunger means align said links to open said valve,
(5) means on said one of said pivoted plunger means for locking it out of its projected position for aligning said toggle links,
(6) a suction-operated lever means, one end of which is engageable with the other of said two intermediate pivots for breaking the alignment of said toggle links to open said valve,
(7) screw means for adjusting the movement of said lever means, and
(8) a diaphragm connected to the other end of said lever means; and
(C) a nozzle connected by a rigid plastic extension to said housing, said nozzle and extension containing:

(1) concentric tubes in said nozzle, the center of one of which is for water and is connected from said valve through said extension, and the annular duct formed between the inner and outer concentric tubes being connected to said inner tube through at least one aperture in the upper end of said nozzle for producing a reduced air pressure in said annular duct, which annular duct communicates through said extension to one side of said diaphragm in said housing, whereby suction is created when the end of the annular duct at the lower end of the nozzle is blocked by the liquid level in the secondary battery, and said suction moves said diaphragm to break said toggle and shut said valve, and (2) adjustable ring means around said nozzle for limiting the distance that the lower end of said nozzle can be inserted into the opening in a battery cell for gauging the liquid level in the cell.

* * * * *